United States Patent
Toncelli

(10) Patent No.: US 8,597,554 B2
(45) Date of Patent: Dec. 3, 2013

(54) ARTICLE OF LIGHTWEIGHT INORGANIC AGGLOMERATE IN FORM OF SLAB, PROCESS OF MANUFACTURING THE SAME AND RESULTING PANEL

(76) Inventor: Luca Toncelli, Bassano del Grappa (IT)

(*) Notice: Subject to any disclaimer, the term of this patent is extended or adjusted under 35 U.S.C. 154(b) by 549 days.

(21) Appl. No.: 11/912,776

(22) PCT Filed: May 3, 2006

(86) PCT No.: PCT/IT2006/000308
§ 371 (c)(1),
(2), (4) Date: Oct. 26, 2007

(87) PCT Pub. No.: WO2006/117828
PCT Pub. Date: Nov. 9, 2006

(65) Prior Publication Data
US 2008/0187742 A1    Aug. 7, 2008

(30) Foreign Application Priority Data

May 3, 2005 (IT) .................. TV2005A0059
Apr. 21, 2006 (IT) .................. TV2006A0071

(51) Int. Cl.
*B28B 1/08* (2006.01)
(52) U.S. Cl.
USPC ............... 264/71; 264/69; 264/102; 264/128
(58) Field of Classification Search
USPC ............ 264/444, 69, 71, 101, 102, 109, 128
See application file for complete search history.

(56) References Cited

U.S. PATENT DOCUMENTS

| | | | | |
|---|---|---|---|---|
| 2,481,390 A * | 9/1949 | Campbell | ............. | 106/605 |
| 3,353,975 A * | 11/1967 | Shannon et al. | ............. | 501/80 |
| 3,366,498 A * | 1/1968 | Osborne | ............. | 501/128 |
| 3,810,773 A * | 5/1974 | Shannon | ............. | 106/409 |
| 4,588,443 A * | 5/1986 | Bache | ............. | 106/644 |
| 5,194,087 A * | 3/1993 | Berg | ............. | 106/18.12 |
| 5,928,741 A * | 7/1999 | Andersen et al. | ............. | 428/35.7 |
| 6,355,191 B1 * | 3/2002 | Toncelli | ............. | 264/40.4 |
| 6,966,945 B1 * | 11/2005 | Mazany et al. | ............. | 106/600 |
| 6,969,422 B2 * | 11/2005 | Mazany et al. | ............. | 106/600 |
| 2007/0003791 A1 * | 1/2007 | Rochette | ............. | 428/703 |

FOREIGN PATENT DOCUMENTS

| | | |
|---|---|---|
| DE | 3246502 | 6/1984 |
| DE | 19855020 A1 | 5/2000 |
| EP | 0003403 A1 | 8/1979 |
| EP | 0378275 A2 | 7/1990 |
| GB | 1499804 A * | 2/1978 |
| JP | 03083844 A * | 4/1991 |
| WO | 97/27982 A | 8/1997 |
| WO | 03051792 A2 | 6/2003 |

OTHER PUBLICATIONS

JP 03083844 A english abstract.*
International Search Report and Written Opinion dated Nov. 30, 2006 from the corresponding PCT/IT2006/000308.

* cited by examiner

*Primary Examiner* — Richard Crispino
*Assistant Examiner* — Elizabeth Royston
(74) *Attorney, Agent, or Firm* — Katten Muchin Rosenman LLP

(57) ABSTRACT

In a method for manufacturing conglomerate articles in sheet form, a mix comprising the following is prepared: an expanded inert granular material; a filler consisting of hollow inorganic microspheres and a plasticizer (clay, quartz or other powder mineral, cellulose); an aqueous silicon-containing binder. A layer of mix, where necessary coated with a fiberglass meshwork in order to increase the mechanical strength thereof, is deposited on a temporary support and subjected to vacuum vibrocompression. The resultant rough-formed sheet is heated at a controlled temperature so as to cause evaporation of the water present in the mix.

A light, sound-absorbing, heat-insulating sheet, rated in Class 0 in terms of fire reaction, suitable to be plastered or painted superficially and used for forming panels and partitions for internal and external use, is obtained.

7 Claims, No Drawings

ARTICLE OF LIGHTWEIGHT INORGANIC AGGLOMERATE IN FORM OF SLAB, PROCESS OF MANUFACTURING THE SAME AND RESULTING PANEL

The present invention relates to a novel article in sheet form and to a method for the manufacture thereof.

More specifically the present invention relates to a novel article in sheet form featuring lightness, heat-insulating and sound-insulating properties.

It is known that for the production of dividing walls, in most cases panels made of wood or materials generally referred to as "plasterboard" are used.

Wood panels, in addition to the high intrinsic cost of the material, also pose the problem of their considerable weight in cases where the walls must be of a suitable strength and robustness and provide good sound insulation; wood is moreover highly combustible and prone to rot. In addition to these problems there is also the difficulty of manufacturing panels which have large dimensions.

Plasterboard walls, for their part, have a low mechanical strength heat and sound-insulating properties.

For many years a technology (which combines a process and a plant) known as Bretonstone system has been known, this technology being used for the manufacture of articles made of a stone conglomerate, in particular articles in the form of sheets or blocks, and composed essentially of the following operations (with reference here to the manufacture of articles in sheet form):

preparing an initial mix consisting of a granular material of predefined and selected particle size and a binder, which in general terms may be cement-based or consist of a hardening resin, the granular material being chosen from among ground stone materials and ceramic materials and consisting partly of an inorganic material, preferably very fine marble or quartz (particle size of about 325-400 mesh), called "filler" in industrial practice;

depositing the mix on a temporary support in the form of a layer of predetermined thickness;

applying to the layer of mix, kept under a predefined vacuum, a compaction pressure together with a vibrating movement of predefined frequency, (this step will be referred herein as vacuum vibrocompression);

hardening the resultant compacted article (subsequently to a setting step in the case of a cement-based binder).

Recently, the Applicant has developed a variant of the aforementioned technology, using a silica-based watery substance as binder.

In a first preferred embodiment, said binder consists of an aqueous dispersion of colloidal silica, also known as "silica sol".

In a second preferred embodiment, said binder consists of an aqueous solution of a sodium or potassium silicate mixed with zinc oxide.

More specifically, the Applicant has developed a method for manufacturing articles adopting the Bretonstone system and therefore the steps indicated above, said method being characterized in that:

(1) the binder used for preparation of the starting mix is silica sol, namely a dispersion, in the aqueous phase, of particles of colloidal silica with nanometric dimensions, or, alternatively, an aqueous solution of a mixture formed by a sodium or potassium silicate, in which the proportion of silica and sodium oxide or potassium oxide, respectively, is between 2 and 4, and by zinc oxide in a proportion of between 5 and 35% by weight;

(2) after the vacuum vibrocompression step, the resultant rough-formed sheet is heated with a predefined temperature gradient up to a temperature of 80-120° C. for a few hours, until a substantially complete evaporation of the water present in the sheet is achieved, resulting in a rough-formed article which is sufficiently strong to allow handling thereof, but has a porosity corresponding to the empty spaces left by mix water removed by means of evaporation;

(3) the rough-formed sheet obtained in the previous step is impregnated with a hardening resin so as to fill the pores, after which the final step of hardening the hardening resin which has penetrated into the sheet is performed.

In connection with the first characterising feature of the method indicated above, when an aqueous dispersion of colloidal silica (also known as silica sol) is used as a binder, this is a binder which is already used in other fields, for example in molding sands, does not require the use of a solvent and is particularly valued since it is non-polluting.

However, as is well-known, in the case of molding sands, the aggregation of the sand in order to form articles such as the so-called cores must have only a temporary duration, i.e. until the metal is cast, following which the sand is recovered in loose form. Therefore, the mechanical properties of the article are of very limited importance and in particular properties such as sound insulation, heat insulation and breathability (understood as meaning the capacity to prevent the passage of liquids, but not that of air and vapours) are of no interest.

It has now been discovered, this forming object of the present invention, that by adopting the method of the Bretonstone system, suitably modified both as regards the composition of the starting mixture and as regards the application steps, it is possible to produce articles in the form of sheets having desired characteristics such as lightness, heat and sound insulation, breathability and adequate mechanical strength.

This object is achieved with by the method in question where the-initial mixture comprises a granular inorganic inert material which is expanded and consequently leightweight, a filler formed by hollow inorganic microspheres and clay and a binder consisting of the already mentioned silica sol or, alternatively, the said aqueous solution of a mixture formed by a sodium or potassium silicate and zinc oxide.

The method is moreover modified in that the step involving impregnation with hardening resin is omitted, since it has the main aim of making the article resistant to the penetration of water.

The resultant article in sheet form has distinctive features such as:

a specific weight of less than 1, usually in the region of 0.8 kg/km$^3$;

a mechanical flexural/tensile strength of about 30 kg/cm$^2$ (3 N/mm$^2$);

a porosity of about 10% by volume;

a rating of fire reaction (inflammability) in class 0, when the initial mixture does not contain organic and therefore inflammable components such as cellulose, replacing—though partially the clay.

The resultant sheets may then be used both for dividing walls and as internal panels and for external use since they may be finished by means of a conventional plastering or painting which increases the resistance to the action of atmospheric agents.

As regards the components of the starting mixture, about 60% by volume consists of the expanded lightweight granular inert material, which is preferably glass or ceramic material.

The materials in question are commercially available (for example, under the name of Leca, Poraver or Liaver) so that further details are not necessary. The particle size thereof is chosen to ensure optimum filling of the mixture, for example in accordance with the well-known Bolomey's formular (a formular commonly used in the preparation of cement-based mixtures).

In the application of the formula according to the present invention, the particle size range of this granular material is between 0.1 and 12 mm and preferably between 0.5 and 6 mm, divided into a suitable number of fractions, normally four.

The quantity of granular material included in each fraction is chosen precisely taking into account Bolomey's formula.

If we consider now the filler, which forms about 24% by volume of the initial mix, it is essentially in the form of a fine powder and comprises about 12% of hollow inorganic microspheres, preferably finite, said material consisting of microgranules of expanded siliceous material obtained from the ashes of coal-fired power stations, with a particle size of between 90 and 150 microns.

The remaining 12% of the filler phase comprises a clay-like mineral which has the function of imparting plasticity to the initial mix. Precisely in order to control the degree of plasticity, part of the clay-like material is normally replaced with quartz powder or other stone material such as feldspar or marble.

In the practical embodiment of the present invention about 50% of the clay-like material is replaced with cristobalite in powder form.

If it is required to increase the flexural strength of the articles in sheet form obtained by the present invention, the two opposite surfaces may be covered, prior to vacuum vibrocompression, with a fibreglass meshwork which remains incorporated within the surfaces of the article.

An important feature of the present invention consists in the fact that it is also possible to produce articles in sheet form of a considerable thickness (about 10-15 cm).

The examples below illustrate the present invention in a non-limiting way.

EXAMPLE 1

In a plant for performing vacuum vibrocompression, a mixture comprising the following components is prepared:

| | |
|---|---|
| expanded granular glass material (0.5-6 mm) | 60% by volume |
| fillite | 12% by volume |
| clay and cristobalite (less than 20 microns) | 12% by volume |
| silica sol | 16% by volume |

In the deposition step this mixture is deposited on a support, forming a layer with a thickness of about 9 cm.

The deposited layer, onto the associated support, is transferred to the vacuum vibrocompression station, where a pressure of about 1 kg/cm$^2$ for a duration of about 60 s under a residual pressure of about 20 mbar is applied by means of a pressing plate. At the same time a vibratory movement at a frequency of about 60 Hz is applied.

The resultant rough-formed sheet is transferred to a drying oven where it undergoes heating at a temperature of about 90° C. for a duration of 10-12 hours.

The resultant article in sheet form, which has a specific weight of about 0.82 kg/dm$^3$ and is therefore very light, has a thickness of 33 mm and a mechanical flexural/tensile strength of about 3 N/mm$^3$.

EXAMPLE 2

Example 1 is repeated except that the following modifications are made.

The quantity of clay is increased by 1% by volume, reducing correspondingly the quantity of cristobalite, so that the plasticity of the mix increases.

In this way it is possible to produce an article in sheet form of a smaller thickness, which in this case is 23 mm, while the physical and mechanical properties of the resultant article remain unchanged.

It is worth noting that, by the method according to the present invention, sheets of considerable dimensions, about 1.5×3.2 m, may be manufactured, so that the formation of dividing walls and partitions is also made a lot easier.

As mentioned above, the clay-like material may be partly or totally replaced with cellulose, which has the same effect of imparting plasticity to the initial mix.

However, in the case of cellulose, the presence of this organic component is to the detriment of the total non-inflammability which instead characterizes those articles in which only inorganic components such as clay and cristobalite are used in the initial mix.

The invention has been described in connection with a preferred embodiment, it being understood that conceptually equivalent modifications and variants are possible and may be envisaged without departing from the scope of protection thereof, as defined in the appended claims.

In particular, the articles in sheet form according to the present invention may be used not only for dividing walls and partitions but also for other purposes.

The invention claimed is:

1. Method for manufacturing an article using vacuum vibrocompression technology, the article being
   conglomerate article in sheet form, obtainable from an initial mix comprising a granular material of selected particle size, a water-based binder and a filler,
   said mix, after deposition on a temporary support being subjected to vacuum pressing with simultaneous application of a vibratory movement and afterwards subjected to drying in order to remove the mix water, characterized in that:
   said granular material consists of expanded glass or expanded ceramic material, having a particle size of between 0.5 and 6 mm;
   said filler consists of hollow inorganic microspheres and a plasticizer; and
   said binder contains silicon, said binder which consists of an aqueous suspension of colloidal silica, and
   wherein the step involving impregnation with a hardening resin is omitted.

2. Method according to claim 1, characterized in that the drying step following the vacuum vibrocompression step is performed at a temperature of 90-120° C. and for a duration of about 12 hours.

3. The method of claim 1, wherein 50% of said plasticizer is replaced by quartz, feldspar, or marble powder or cristobalite powder.

4. The method of claim 1, wherein the granular material comprises expanded glass or an expanded ceramic material.

5. The method of claim 1, wherein the sheet comprises a tensile strength of 30 kg/cm$^2$.

6. Method for manufacturing an article using vacuum vibrocompression technology, the article being conglomerate article in sheet form, obtainable from an initial mix comprising a granular material of selected particle size, a water-based binder and a filler, said mix, after deposition on a temporary support being subjected to vacuum pressing with simultaneous application of a vibratory movement and afterwards subjected to drying in order to remove the mix water, characterized in that:

said granular material consists of expanded glass or expanded ceramic material, having a particle size of between 0.5 and 6 mm;

said filler consists of hollow inorganic microspheres and a plasticizer; and said binder contains silicon, said binder which consists of an aqueous solution of a mixture formed by a sodium or potassium silicate and zinc oxide are used as components of the initial mixture, and wherein the step involving impregnation with a hardening resin is omitted.

7. The method of claim 6, wherein the proportion of zinc oxide is 10% by weight of the mix.

\* \* \* \* \*